May 18, 1965   A. F. ERICKSON   3,184,007
WHEEL CYLINDER MEANS WITH FEEDBACK
Filed June 25, 1962
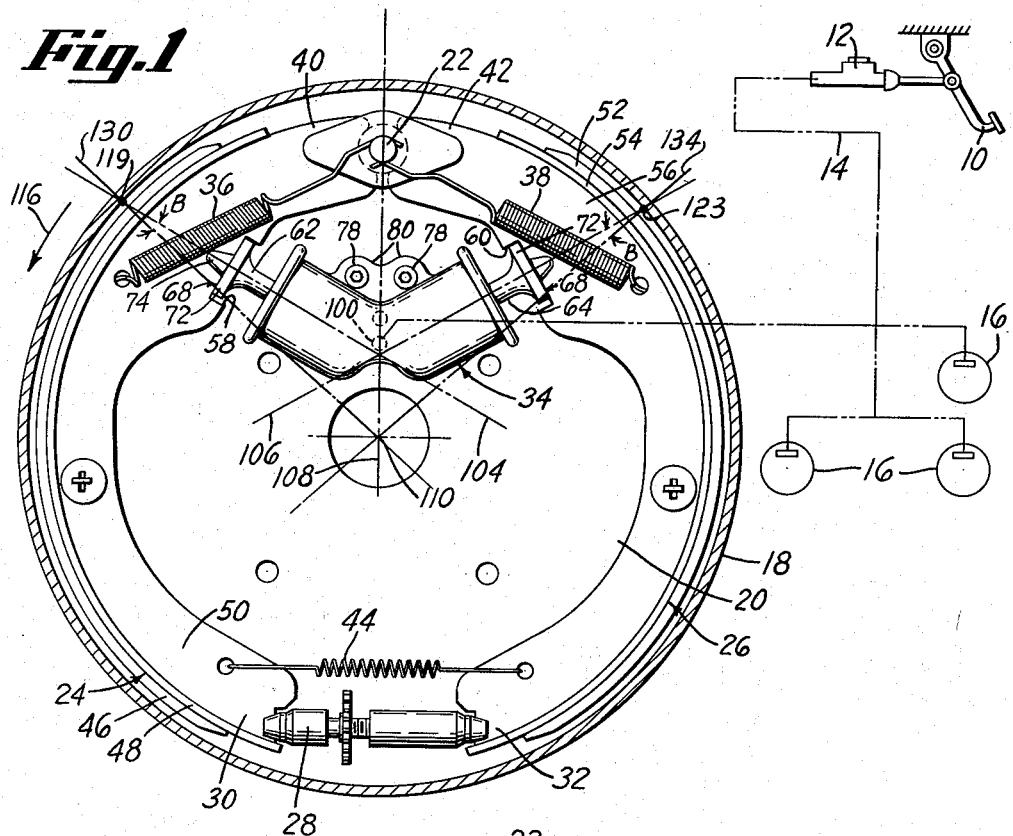
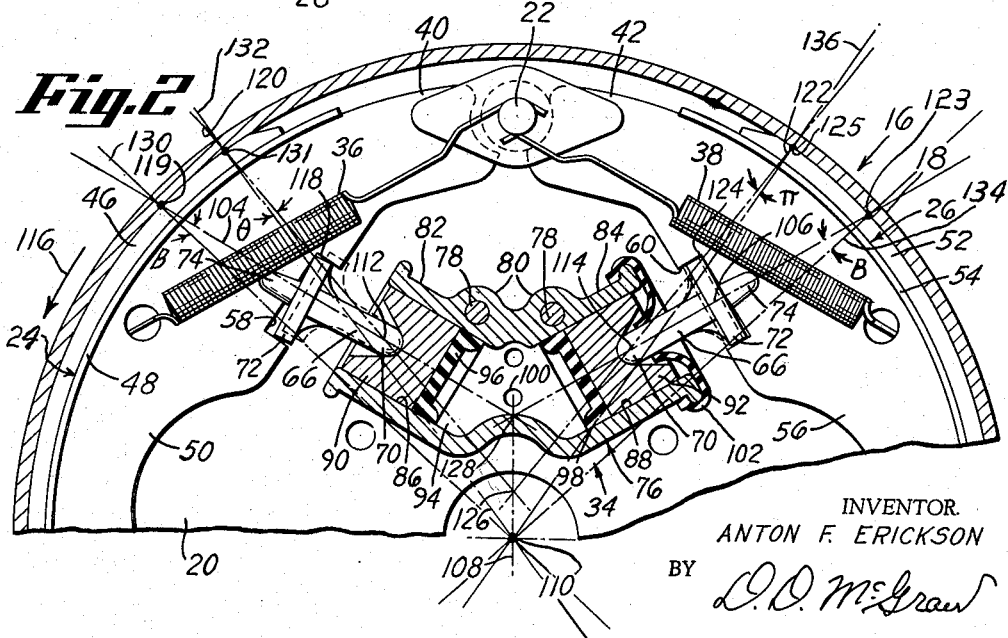
INVENTOR.
ANTON F. ERICKSON
BY
D.D. McGraw
ATTORNEY 3,184,007
WHEEL CYLINDER MEANS WITH FEEDBACK
Anton F. Erickson, Dayton, Ohio, assignor to General Motors Corporation, Detroit, Mich., a corporation of Delaware
Filed June 25, 1962, Ser. No. 204,775
3 Claims. (Cl. 188—78)

The invention relates to a brake assembly and more particularly to a brake assembly which may be utilized on a vehicle wheel. The invention is particularly applicable to internally expanding brakes of the duo-servo type. It has been common practice to provide a wheel cylinder for duo-servo brakes having pistons and cups which are oppositely disposed along a common axis and act on the primary shoe and the secondary shoe adjacent an anchor pin engaged by adjacent ends of the shoes. The lines of force exerted by the wheel cylinders on the shoes are coexistent in such constructions and are perpendicular to a line passing through the anchor pin and the axis of drum rotation. The wheel cylinders are therefore required to move the shoes through a substantially greater distance than that required to take up the radial clearance between the shoes and the drum. The thrust link acting between the primary shoe and one piston of the wheel cylinder is also so positioned in such a construction that it tends to follow the primary shoe after the primary shoe engages the drum and is rotated by the drum as a part of the self-energizing action of the shoes. This requires and permits the fluid pressure acting on the piston to move the piston further outwardly, requiring an additional volume of pressurized fluid to be supplied to the wheel cylinders from the master cylinder.

It is now proposed to provide an assembly wherein the maximum piston stroke of the wheel cylinder is determined by the clearance between the brake shoe lining and the rotating drum. It is also proposed to provide a construction wherein the servo action of the primary shoe rotating in the direction of rotation of the brake drum decreases the volume of fluid required in the wheel cylinder to provide a fluid feedback to the hydraulic system. Since the required stroke of the pistons in the wheel cylinders will be substantially less in order to engage the shoes with the drum, and will be decreased upon servo action of the brakes, a short stroke master cylinder and brake pedal arrangement may be utilized as compared to the master cylinder and brake pedal stroke arrangement required when substantially great quantities of pressurized fluid must be furnished as in previous constructions.

In order to accomplish these results a wheel cylinder having a V-shape is utilized with each arm of the V having a cylinder formed therein and receiving a piston and a cup. Thrust links are provided from the pistons to the brake shoes in order to transmit the brake engaging forces from the hydraulic system to the shoes. Each thrust link pivots in a socket formed in its associated piston and is engaged with its associated shoe by a flat enlarged end. The flat enlarged end may be either circular, rectangular or otherwise formed and is received in a notched section of the shoe web so that when the shoes are disengaged from the drum there is a flat linear engagement surface on each link. The effective thrust point of each link is then along the link axis which also contains the link-piston pivot point and is substantially along the axis of the cylinder in which the piston is received. The cylinder axes intersect substantially on a line joining the center line of the anchor pin and the drum rotating axis so that they also extend substantially radially in relation to the drum. It is within the scope of the invention to mount the wheel cylinder assembly intermediate the anchor pin and drum axis of rotation and sufficiently above the drum axis to clear the axle which may extend through the brake backing plate. The thrust links are canted after the shoes are engaged with the drum by servo action of the shoes so as to pivot on one edge end of the enlarged flat link and to effectively increase the link length along the thrust link force line and to shift the force lines of the links actuating the two shoes so that they intersect the line joining the anchor pin and the drum rotational axis at a point nearer the drum axis than the point of intersection of the cylinder axes. This action provides the fluid feedback which aids in decreasing the amount of pressurized fluid required to energize the brakes.

In the drawing:

FIGURE 1 is an elevation view of a wheel brake assembly embodying the invention with parts broken away and schematically illustrating a vehicle wheel brake system.

FIGURE 2 is an enlarged view of a portion of the wheel brake assembly shown in FIGURE 1, with parts broken away and in section.

The vehicle brake system schematically illustrated in FIGURE 1 includes a brake pedal 10, a master cylinder 12 actuated by the pedal 10 and a pressurized fluid conduit system 14 leading to the wheel brake assemblies 16. One of the wheel brake assemblies 16 is shown in greater detail. The brakes are illustrated as being released. The assembly includes a rotatable brake drum 18, a nonrotatable backing plate 20 having an anchor pin 22 secured thereto, a primary shoe 24 and a secondary shoe 26 joined by a suitable adjustment element 28 at their adjacent ends 30 and 32, a wheel cylinder assembly 34, and retracting springs 36 and 38. Shoe ends 40 and 42 are engaged with anchor pin 22 when the brakes are in the released condition. A spring 44 holds shoe ends 30 and 32 in engagement with the adjusting element 28. Other suitable portions of a wheel brake assembly which are well known in the art may be provided but are not illustrated since they are not required as a part of the invention. Instead only so much of a wheel assembly as to provide an operative structure has been illustrated.

Primary shoe 24 is provided with brake lining 46 suitably secured to the shoe rim 48, which is in turn secured to the shoe web 50. Secondary shoe 26 is similarly constructed and is provided with brake lining 52 on rim 54, and web 56. A notch 58 is formed in web 50 and a similar notch 60 is formed in web 56 to receive thrust links 62 and 64. Each thrust link is provided with a body section 66, a shoe web engaging end 68 and a wheel cylinder piston engaging end 70. End 68 has an enlarged section 72, which may be of any suitable form such as circular or rectangular, but is sufficiently large to engage the flat surface engagement along substantially the linear length of the bottom of the shoe web notch 58 or 60 when seated. Suitable centering guides 74 may also be provided to extend on either side of the shoe web so as to locate and hold the thrust link in position.

The brake is illustrated in detail in FIGURE 2, wherein a brake assembly 16 is in the brake apply condition. The wheel cylinder assembly 34 includes a housing 76 which is V-shaped and is secured to the backing plate 20 by bolts 78 passing through suitably provided mounting lugs 80. Each arm 82 and 84 of the V-shaped housing 76 is formed to provide a cylinder. Cylinder 86 is therefore provided in arm 82 and cylinder 88 is provided in arm 84. Piston 90 is reciprocably received in cylinder 86 and piston 92 is reciprocably received in cylinder 88. A pressurized fluid chamber 94 is provided intermediate the pistons 90 and 92 and piston cups 96 and 98 are provided to retain pressurized fluid in chamber 94, as is well known in the art. Fluid pressure from conduit system 14 is provided through aperture 100 which is in fluid communication with chamber 94. A suitable boot 102 may be provided at the end of each cylinder and be in sealing engagement with each thrust link to prevent the entry of foreign matter into cylinders 86 and 88. Only one such boot is shown, and that is shown in FIGURE 2, although it is obvious that boots may be provided for both ends of the assembly 34.

The cylinder axis 104 of cylinder 86 preferably intersects the cylinder axis 106 of cylinder 88 substantially on the line 108 extending between the center of anchor pin 22 and the axis of rotation 110 of the drum 18. The axes 104 and 106 also extend through the pivot centers 112 and 114 of the piston engaging ends 70 of the thrust links. The force transmitting lines of the thrust links 62 and 64 also preferably lie along axes 104 and 106 when the brake shoes are being moved from the fully disengaged position shown in FIGURE 1 and until the primary shoe lining 46 engages the inner surface of the rotating drum 18 so as to begin the servo action of the shoe. As may be seen in FIGURE 1, these force lines, extending along axes 104 and 106, are substantially radial to the brake drum, differing from the drum radial line 130 by the small angle $\beta$, so that the major component of the force acting along this line acts to move lining 46 to take up the lining clearance. It can be seen that the length of stroke of piston 90 is therefore substantially equal to the clearance between the lining 46 and the drum 18. This compares favorably with the distance required to engage the primary shoe when axially aligned wheel cylinders are utilized which are located more closely adjacent the anchor pin. Such constructions utilize a substantial amount of the piston stroke to move the primary shoes arcuately as well as radially outward. The small angular relation of the force line of each thrust link as illustrated in the drawing by the angles $\beta$ is therefore advantageous since it requires substantially less fluid displacement of the pistons acting on the thrust links to move the shoes into engagement with the drum.

When the primary shoe lining 46 engages the rotating drum 18 it is moved arcuately in the direction of drum rotation illustrated by arrow 116 to provide servo action of the system, as is well known in the art. The arcuate movement of shoe web 50 results in a pivoting movement of thrust link 62 about point 112 from the position illustrated in dashed lines in FIGURE 2 to the position illustrated in solid lines. This movement is somewhat exaggerated in the drawing in order to provide a clearer representation of the actions taking place as the brakes are applied. The bottom of the groove 58 is rotated and translated so that it is no longer in surface engagement with the flat surface of enlarged section 72 of the thrust link. This results in engagement of the thrust link with web 50 at the enlarged section end 118. In order to permit the slight pivotal movement of thrust link section 72 in the groove 58 the groove is slightly larger than the length of section 72 extending in the plane of the web 50. The force line 120 of thrust link 62 now passes through pivot point 112 at the piston end, through pivot point 118 at the web end of the link, and intersects the inner surface of the drum 18 at point 121, forming angle $\theta$ with the drum radial line 132. This increases the effective length of link 62, thus tending to move piston 90 inwardly as the pivoting action takes place, resulting in lesser piston displacement than would be required if the effective length of link 62 remained constant. Similarly force line 122 extends through pivot point 124 of link 64 which engages web 56, through pivot point 114 adjacent piston 92, and through point 125 on drum 18, forming the angle $\pi$ with drum line 136. Link 64 will not necessarily pivot as far as link 62, but effective link length is nevertheless increased. Force lines 120 and 122 intersect at point 126 which may lie on or near line 108 and intermediate the drum axis 110 and the point 128 of intersection of cylinder axes 104 and 106. Thus further exertion of the forces through the thrust links to the shoes from the wheel cylinder assembly 34 act even more radially. This is further indicated by the decrease in angular relation of the thrust link lines of force 104, 106 and 120, 122 and the drum radii 130, 132 and 134, 136 passing through the respective points 119, 121, and 123, 125 on the drum intersected by the extended lines of force as the brake is actuated. This angular relation $\beta$ is of course relatively small in the brake release condition since it is desirable to have the initial movement of the thrust links to be more radial of the brake drum than in previous constructions. The angle $\theta$ may at its optimum be reduced to zero upon brake actuation so that the final force line 120 of the piston and thrust link actuating the primary shoe is along a drum radius.

I claim:

1. A brake shoe actuating mechanism for a servo brake comprising a brake shoe and a rotatable brake drum engageable by said brake shoe, said actuating mechanism comprising a wheel cylinder having a piston movable therein along an axis, a thrust link movable by said piston and having an output end engaging said brake shoe and actuating thereon at an effective point in axial alignment with the piston axis until said shoe engages said drum to be moved in servo action thereby, said thrust link output end then pivoting about said piston in the direction of rotation of said drum and pivoting on said brake shoe to move the effective point of engagement in the direction opposite to the direction of rotation of said brake drum.

2. A brake shoe actuating mechanism for a servo brake comprising a brake shoe and a rotatable brake drum engageable by said brake shoe, said actuating mechanism comprising a wheel cylinder having a piston movable therein along an axis, a thrust link movable by said piston and having an output end engaging said brake shoe and acting thereon at an effective point in axial alignment with the piston axis until said shoe engages said drum to be moved in servo action thereby, said thrust link output end then pivoting about said piston in the direction of rotation of said drum and pivoting on said brake shoe to move the effective point of engagement of said thrust link with said brake shoe, said piston axis when extended passing through a first point on said drum having a first drum radial line therethrough and forming a first angle with said first drum radial line, said thrust link having an effective force line passing through said effective point of engagement after pivotal movement thereof and when extended passing through a second point on said drum having a second drum radial line therethrough and forming a second angle with said second drum radial line, said second angle being smaller than said first angle.

3. A brake assembly comprising, a drum rotatable about an axis, a nonrotatable support including a shoe anchor, a primary shoe and a secondary shoe having ends engageable with said anchor, a hydraulic motor assembly mounted on said support and having a V-shaped housing forming opposite and angularly disposed cylinders having axes intersecting intermediate said anchor and said drum rotatable axis, a piston movable axially in each of said cylinders, a pair of thrust links one of which pivotally engages each of said pistons to pivot about a point on each of said cylinder axes, said links having enlarged flat ends engaging said shoes and effectively acting through points on said cylinder axes until said primary shoe engages said brake drum and is moved arcuately in duo-servo action to arcuately move said secondary shoe, said thrust links then rocking on said shoes to move the shoe engaging points toward said anchor, thereby increasing the effective lengths of said links and moving the lines of link transmitted force from said cylinder axes to angular relation to said cylinder axes to intersect between said anchor and said drum axis intermediate the drum axis and the point of intersection of said cylinder axes.

References Cited by the Examiner

UNITED STATES PATENTS

| | | | |
|---|---|---|---|
| 1,786,856 | 12/30 | Madden | 188—78 |
| 1,920,078 | 7/33 | Hargreaves | 188—152 |
| 1,948,822 | 2/34 | Lindblom | 188—152 |
| 1,965,894 | 7/34 | Huck | 188—78 X |
| 2,131,613 | 9/38 | Chase et al. | 188—78 |
| 2,264,282 | 12/41 | Ambrose | 188—152 |
| 2,266,727 | 12/41 | Ambrose | 188—78 X |
| 2,275,722 | 3/42 | Bowen | 60—54.6 |
| 2,825,241 | 3/58 | Ferris | 74—579 |
| 2,885,035 | 5/59 | Rubly | 188—152 |
| 2,902,120 | 9/59 | Nahodil | 188—79.5 |
| 2,928,509 | 3/60 | Del Sole | 188—78 X |

ARTHUR L. LA POINT, *Primary Examiner.*

A. JOSEPH GOLDBERG, RALPH D. BLAKESLEE,
*Examiners.*